Sept. 9, 1958     L. I. KELLY     2,851,297
KITCHEN UTENSIL
Filed Feb. 15, 1956
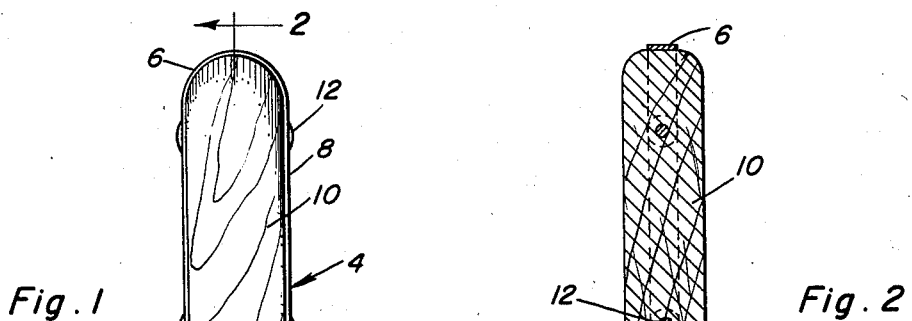
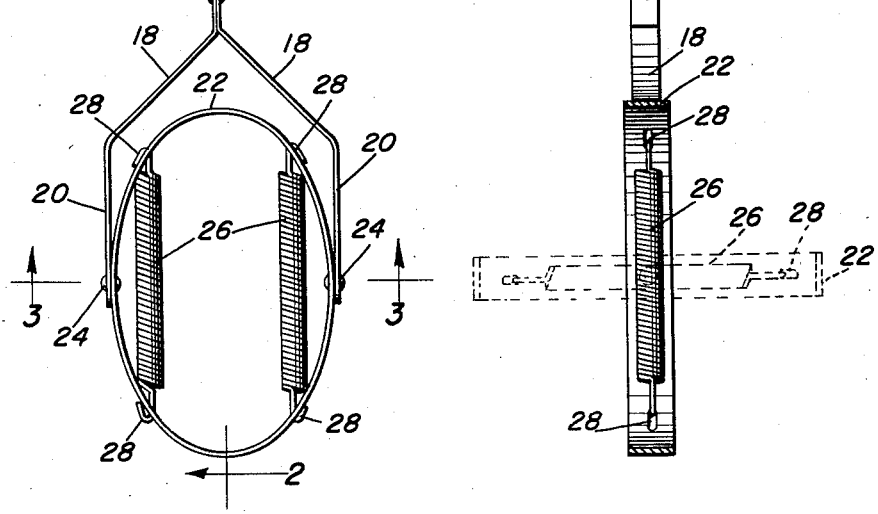
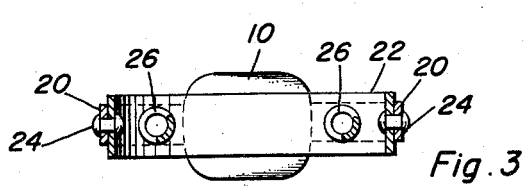
Luther I. Kelly
INVENTOR.

United States Patent Office

2,851,297
Patented Sept. 9, 1958

2,851,297

KITCHEN UTENSIL

Luther I. Kelly, Gulfport, Miss.

Application February 15, 1956, Serial No. 565,643

1 Claim. (Cl. 294—1)

The present invention relates to certain new and useful improvements in a handy tool or implement, herein classified as a kitchen utensil, and expressly constructed and designed to assist a user in picking up, lifting and handling a boiled egg.

An obvious object of the invention is to structurally, functionally and otherwise improve upon implements and utensils offered by others to assist a user in fishing for and removing a too-hot-to-handle egg from boiling water in a pan or the like and thereafter transporting the egg to a handy place for shelling and subsequent consumption. To this end, an instrumentality is utilized which, it is believed, will be endorsed by manufacturers and retailers and adopted for efficacious successful use by restaurant cooks, housewives and others confronted with the unhandy task of handling hot eggs.

In carrying out the invention a handle is provided on one end with a fork and an oval shaped frame is hingedly mounted between the arms of the yoke. Coil springs or equivalent expedients are carried by the frame and are arranged to function as egg-embracing and handling members.

Other objects, features and advantages will become more readily apparent from the following description and the accompanying sheet of illustrative drawings.

In the drawings, wherein like numerals are employed to designate like parts throughout the same:

Figure 1 is a plan view of an egg lifting and handling utensil constructed in accordance with the invention and showing the frame folded in a flat condition to be stored away in a kitchen cabinet drawer or the like when not in use;

Figure 2 is a section on the lengthwise line 2—2 of Figure 1 looking in the direction of the arrows and showing the position of the spring-equipped frame in phantom lines, the position assumed when employed in egg lifting and handling; and, Figure 3 is a section on the line 3—3 of Figure 1 looking in the direction of the arrows.

Referring now to the drawings with the aid of reference numerals, the numeral 4 designates a flat metal strip which is of elongate form and bent upon itself between its ends as at 6 to form an elongate loop 8 in which a filler block is fitted and secured. The block is denoted at 10 and the fastening elements which pass through the side members of the loop and into the marginal edges of the block are denoted by the numerals 12. This is the handle proper. Extending beyond one end of the handle there is a shank 14 which is actually made up of components in the metal strap which are fastened back-to-back and riveted as at 16. At the outer end of the shank there is a fork or yoke embodying divergent portions 18 and spaced parallel terminal limb portions 20. The aforementioned ovate endless metal frame 22 is pivotally mounted in the yoke between the arms or limbs 20 by way of the assembling and pivoting rivets 24.

It will be noticed that one half of the frame projects into what may be called the confines of the yoke and the other half projects forwardly beyond the limbs 20, that is, when the frame is coplanar with the yoke, this being the folded ready-to-store form of the utensil. Usually when the device is in use, it is withdrawn from a storage drawer or the like (not shown) and the frame 22 is turned at right angles so that it may be more readily dipped into the hot boiling water for purposes of lifting out and handling a hot egg. To grasp the egg the frame is provided with a pair of spaced parallel coil springs and these are denoted by the numerals 26 and they are arranged lengthwise within the limits of the frame 22 and have their ends fashioned in the hooks 28 and suitably anchored to cooperating frame portions in the manner shown. Being thus spaced apart and coplanar, these springs will spread apart when the egg is forced between them and will then exact a yielding grip on substantially diametrically opposite sides of the egg so that the egg may be dipped, lifted and handled and deposited for shelling and opening, all in a substantially obvious manner.

The main aspect of the invention is the frame or equivalent means provided with coplanar spaced-apart substantially parallel coil springs constituting egg gripping members and appropriate handle means therefor.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

A kitchen utensil through the medium of which one may safely and conveniently catch hold of, remove and otherwise handle a boiled egg from boiling water comprising a flat frame substantially ovate in plan, a pair of coil springs situated in spaced coplanar relationship within the encompassing limits of said frame and stretched across the frame and having their end portions secured to cooperating end portions of said frame, a handle, a shank carried by said handle, said shank terminating at the end opposite said handle in a yoke, said frame having a half-portion confined in its non-use position between the arms of the yoke and having its median side portions disposed between the end portions of the respective arms and hinged to said arms on an axis extending laterally across the frame and said arms.

References Cited in the file of this patent

UNITED STATES PATENTS

| 698,226 | Roberts | Apr. 22, 1902 |
| 704,848 | Minton | July 15, 1902 |
| 713,672 | Oliver | Nov. 18, 1902 |
| 771,886 | Smith | Oct. 11, 1904 |
| 1,995,619 | Minto | Mar. 26, 1935 |

FOREIGN PATENTS

| 3,628 | Great Britain | Jan. 15, 1903 |